US008187406B2

(12) United States Patent
Patel et al.

(10) Patent No.: US 8,187,406 B2
(45) Date of Patent: May 29, 2012

(54) METHOD OF PRODUCING A HIGH SECURITY FILM AND HIGH SECURITY FILM PRODUCED BY SAID METHOD

(75) Inventors: Shilpan Pravinchandra Patel, Mumbai (IN); Nikita Kamlesh Thanawala, Mumbai (IN)

(73) Assignee: Arrow Coated Products, Ltd. (IN)

( * ) Notice: Subject to any disclaimer, the term of this patent is extended or adjusted under 35 U.S.C. 154(b) by 875 days.

(21) Appl. No.: 12/278,031

(22) PCT Filed: Dec. 1, 2006

(86) PCT No.: PCT/IN2006/000481

§ 371 (c)(1), (2), (4) Date: Aug. 1, 2008

(87) PCT Pub. No.: WO2007/072498

PCT Pub. Date: Jun. 28, 2007

(65) Prior Publication Data

US 2009/0014999 A1 Jan. 15, 2009

(30) Foreign Application Priority Data

Dec. 1, 2005 (IN) ........................ 1486/MUM/2005

(51) Int. Cl.

| | |
|---|---|
| ***B44C 1/17*** | (2006.01) |
| ***B29C 65/52*** | (2006.01) |
| ***B32B 37/02*** | (2006.01) |
| ***B32B 37/12*** | (2006.01) |
| ***B32B 38/14*** | (2006.01) |
| ***B32B 38/16*** | (2006.01) |
| ***B32B 43/00*** | (2006.01) |

(52) U.S. Cl. ........ 156/234; 156/235; 156/240; 156/247; 156/277; 156/289

(58) Field of Classification Search .................. 156/230, 156/231, 233, 234, 235, 240, 247, 250, 271, 156/277, 289, 308.2, 308.4, 324.4
See application file for complete search history.

(56) References Cited

U.S. PATENT DOCUMENTS 5,299,496 A * 4/1994 Martin et al. ................. 101/181
5,631,039 A * 5/1997 Knight et al. ..................... 427/7
(Continued)

FOREIGN PATENT DOCUMENTS

EP 0414362 2/1991
(Continued)

OTHER PUBLICATIONS

English Abstract of FR 2,771,111.* Machine English Translation of FR 2,771,111.*

*Primary Examiner* — Sing P Chan
(74) *Attorney, Agent, or Firm* — Polster, Lieder, Woodruff & Lucchesi, L.C.

(57) ABSTRACT

The invention relates to a high security film, optionally in the form of a slit thread or a micro tape, which is then inserted into high security paper such as a bank note paper and the like during the paper making process. The invention envisages a novel method of producing such a high security film using a print transfer method, wherein one or more security features are incorporated on one or more indicia including letters, optionally graphics, during such a production process, using multiple printing stations and lamination.

23 Claims, 3 Drawing Sheets

U.S. PATENT DOCUMENTS

| | | | | |
|---|---|---|---|---|
| 5,815,292 | A * | 9/1998 | Walters | 359/2 |
| 6,414,761 | B1 * | 7/2002 | Stepanek | 359/2 |
| 7,333,268 | B2 * | 2/2008 | Steenblik et al. | 359/619 |
| 7,893,005 | B2 * | 2/2011 | Funada et al. | 503/227 |
| 7,935,540 | B2 * | 5/2011 | Kalgutkar et al. | 436/525 |
| 2002/0068224 | A1 * | 6/2002 | Danda et al. | 430/1 |
| 2005/0167035 | A1 | 8/2005 | Laskey et al. | |

FOREIGN PATENT DOCUMENTS

| | | | |
|---|---|---|---|
| EP | 0929000 | | 7/1999 |
| FR | 2771111 | A1 * | 5/1999 |
| GB | 2259888 | | 3/1993 |
| WO | WO 2005097515 | A1 * | 10/2005 |
| WO | WO 2007011331 | A2 * | 1/2007 |

* cited by examiner

METHOD OF PRODUCING A HIGH SECURITY FILM AND HIGH SECURITY FILM PRODUCED BY SAID METHOD

CROSS-REFERENCE TO RELATED APPLICATIONS

This application is the National Stage of International Application No. PCT/IN2006/00481 filed Dec. 1, 2006 which claims priority to Indian application number 1486/MUM/2005, filed on Dec. 1, 2005.

FIELD OF INVENTION

The invention relates to a high security film, optionally in the form of a slit thread or a micro tape, which is then inserted into high security paper such as a bank note paper and the like during the paper making process. The invention envisages a novel method of producing such a high security film using a print transfer method, wherein one or more security features are incorporated on one or more indicia including letters, optionally graphics, during such a production process, using multiple printing stations and lamination.

BACKGROUND OF THE INVENTION

Security films and slit micro tapes are well known to the industry. These are known as security thread also. This "thread" can be seen embedded almost in most of the currency paper. The process of manufacture and its insertion is also well known for many years. The following patents describe various types of security threads and the process of their insertion into the paper.

U.S. Pat. No. 5,002,636 describes a method of making security paper comprising the steps of providing a strip of plastic material; applying a soluble pigmented material on said plastic strip; applying a layer of metal over said soluble pigmented material; printing over said metal with an insoluble pigmented material to provide printed indicia; removing said metal and said soluble pigmented material from said plastic strip except from under said printed indicia to form a security thread; and embedding said security thread in a colored paper.

The security strip of the above patent requires a protective layer of plastic material over said security thread prior to embedding said security thread in said paper. Also, the removal of said metal and said soluble pigmented material includes steps of either ethyl alcohol etching or incase of a water soluble pigmented material will include the steps of water dissolution. Hence, the process is quite complex and consumes a lot of time U.S. Pat. No. 4,761,205 describes a method of forming a security paper by inserting the security thread within paper fiber slurry at a predetermined location in a papermaking machine during dewatering of said fiber slurry before said fiber is consolidated into a continuous paper web. The security thread is formed either by printing indicia on the metalized plastic film by the help of a varnish resistant to metal reactive solvent and then subjecting the film to a metal reactive solvent; or hot stamping metallic indicia onto a plastic film; or by selectively metalizing metal indicia onto a continuous planar plastic film; or by transferring metal indicia from a substrate onto a continuous plastic film.

However, it has been found that these types of products can be simulated by counterfeiters, by virtue of the increased availability of technology.

U.S. Pat. No. 4,552,617 relates to thin strips of a carrier material, microprinted identifying indicia, which dissolves during the dewatering and drying stage of the paper making process. The microprinted indicia remains intact and is readable by means of transmitted light yet is neither legible nor reproducible with reflected light.

However, these films whether water soluble or plastic can only be inserted into the paper web in the form of a thread and that too in the machine direction only. It is not possible to insert these threads with different patterns and shapes into the paper web. E.g. a paper currency cannot be seen with round shaped thread inserted into it. Also, these products can be counterfeited easily due to lack of higher degree of security.

Also, security elements such as UV fibres, tracers, taggants and the like are randomly mixed in pulp as paper is formed. As much of the paper making process at the initial stage is maximum water, which is drained and recycled, these elements are lost or conglomerated at a non-discreet area, which results in monetary losses. These security/elements are very expensive.

It has been the endeavor of all security paper mills to control costs, and so if these security features can be precisely guided into a known location, for example by using the printed text of the security thread, then there can be a lot of cost saving.

Further, embedding of security thread at a precise place slows down the paper machine thus giving lesser yield of paper. Wider width security thread has it's own problem as the pulp fibres have to flow onto a wider area thus slowing down the machine further. Embedding of security thread also creates uneven bumps at certain places which necessitates the web to be moved sideways to spread the tension values throughout the cross direction of the web. This curtails higher lengths of paper to be wound on a single roll, which results in lesser yields due to various roll changes. This needs higher margin of variance for registration of the thread in the paper web.

Hence, to be ahead of the fraudsters there is a need to develop new and complex products and hence enhance the degree of security so that the product will not be simulated easily and at the same time such security thread with high degree of security is inserted into the paper web using existing paper making process so as not to incur costs of new machinery and equipments.

Hence, the main objective of the present invention is to provide multiple security features on individual indicia or graphics in the security film.

Another objective of the present invention is to eliminate the process of demetallization and thus avoid the use of corrosive solvents.

Yet another objective of the present invention is to provide a security film having indicia printed in a particular pattern and shape and inserting the security film into the paper during the paper making process so as to restrict the counterfeiters from simulating the product.

SUMMARY OF INVENTION

According to one aspect of the invention, there is provided a method of producing high security film for incorporating into a security paper such as currency note paper or the like comprising of the following steps:

i. loading a donor web roll on an unwinder of a multipass printing machines, unwinding and passing the donor web through a set of guide and tension control rolls into printing zone;

ii. printing the desired indicia on the donor web by passing it through one or more print station/s containing solution of adhesive and one or more security element/s;

iii. drying the donor web with adhesive printed indicia containing security elements by passing through one or more set of driers for evaporating the solvent contained in the adhesive leaving desired selective indicia pattern;

iv. laminating the donor web containing said adhesive printed selective indicia pattern along with one or more security element, with a receiver web by passing the donor web and receiver web through nip/press rolls;

v. immediately splitting/separating out the donor web and receiver web from step (iv) on two different shafts to transfer the adhesive printed selective indicia pattern along with one or more security elements to the receiver web forming security film.

vi. rewinding the laminated donor web and receiver web from step (iv) on a rewinder; ageing the laminated donor web and receive web by stacking the roll on a stacker for the desired ageing period and then splitting/separating out the donor web and receiver web, on two different shafts to transfer the adhesive printed selective indicia pattern along with one or more security elements to the receiver web forming a high security film.

The donor web can be a hot stamping foil or a holographic foil or a non metallic stamping foil.

The donor web consists of a first layer of plastic film such as a polyester film or a polypropylene film, a second layer of release coat, a third layer of dye coat to give various colours or effects and a fourth layer of metallic coat.

The donor web also includes other layers such as a tie coats, protective coats, coatings for various effects, adhesive coats and the like.

According to one embodiment of the invention, one or more security elements are added in the die coat layer and/or the tie coat layer and/or adhesive layer and/or any other layers of the donor web.

According to another embodiment of the invention, the printing of the desired indicia on the donor web is carried out at the print station by using gravure cylinder or a flexo etched plate or by a web screen system.

According to another embodiment of the invention, the printing process of donor web with adhesive containing security elements is repeated any number of times in a number of print stations and the security element in the adhesive at each print station can be the same or different depending upon the degree of security required for the security paper.

The indicia being printed includes any type of texts, graphics or images or a combination thereof printed on the donor web in desired pattern in straight line or curve or circle or any other shapes.

The indicia printed on the donor web can be visible or invisible and optionally machine readable using external readers like specific electronic readers, light sources, PCRs or computers.

The adhesive solution being used for printing as per the process, is selected from the ones based on solvent such as hydrocarbons, xylenes, Toluols, organic solvents, ketonic solvents, alcohols or their derivatives or any combination thereof and are either one component or multi component or based on external catalyst.

The adhesive solution used for printing, contains any one or combination of resins like acrylics, polyurathane, Polyvinyl Acetate (PVAC), epoxy, tackifying agents and the like.

The adhesive solution used for printing can also be a water based adhesive comprised of a mixture of water and gluing ingredients such as glue, CMC, and starch solution.

The security elements contained in the adhesive solution used for printing or added in the die coat layer/tie coat layer/heat activated and pressure activated layer or any other layer of the donor web, are selected from overt or covert security element such as rare earth pigments, light fluorescing pigments, machine readable materials, DNA taggants, magnetic particles, UV upconversion pigments, security microtracers, nanoparticles, micro wires and the like. However, these are by no means limiting.

The security elements are either visible, invisible or machine readable using external readers like specific electronic readers, light sources, PCRs, or Computers.

According to yet another embodiment of the invention, the receiver web is a water soluble film (WSF) produced a process such as by direct casting on a conveyor, by casting on a detachable liner, a T-die casting, by blowing film on extrusion machine by extrusion via T-die extrusion or direct of WSF film forming resins.

The WSF is either a cold water soluble film or a warm water soluble film or a hot water soluble film or a non-soluble hydrophilic biodegradable film. The water temperature depends upon the formulations and resins of the WSF and ranges in between 5° C. to 100° C.

According to yet another embodiment of the invention, the receiver web is a plastic film.

According to yet another embodiment of the invention, the temperatures at the set of driers used for evaporating the solvent ranges from 30° C. to 190° C., preferably from 45° C. to 150° C., more preferably from 60° C. to 120° C.

According to yet another embodiment of the invention, the pressure at the nip/press rolls, applied for laminating the two webs ranges from 0.5 psi to 10 psi, preferably from 1 psi to 6 psi, more preferably from 2 psi to 4 psi.

According to yet another embodiment of the invention, the aging period ranges from 2 minutes to 72 hours, preferably from 5 minutes to 36 hours and more preferably from 10 minutes to 24 hours.

According to yet another embodiment of the invention, the high security film for incorporating into a security paper such as currency notes comprises printing selective indicia with the help of adhesive containing one or more security elements on the receiver web followed by drying and then laminating the donor web to transfer the metallic surface of the donor web on the receiver web; the receiver web being a plastic film or water soluble film (WSF) and the donor web being the hot stamping foil or the holographic foil.

According to yet another embodiment of the invention, the desired indicia is reverse printed as per the requirement.

According to a second aspect, the invention provides a high security film having precisely registered and cleanly transferred indicia pattern(s) such as texts, graphics and/or images comprising one or more security elements in one or more texts or nanopart of an image or graphics.

According to a third aspect, the invention provides a method of incorporating the high security film in the high security paper like currency notes, in which the high security film/roll is silt into micro tapes (also known as the security thread) and inserted into the paper web during the paper making process.

According to a fourth aspect, the invention provides a method in which the whole web of the high security film is inserted into the paper web during the paper making process so that the indicia including letters, images and/or graphics printed in a particular pattern is incorporated into the paper at a precise location.

As per yet another embodiment of the invention, the whole web of the high security film is perforated at selective places for subsequent insertion into the paper web during the paper making process.

BRIEF DESCRIPTION OF THE SEVERAL VIEWS OF THE DRAWINGS

The invention will now be described with reference to accompanying drawings wherein.

DETAILED DESCRIPTION

Figure 1:
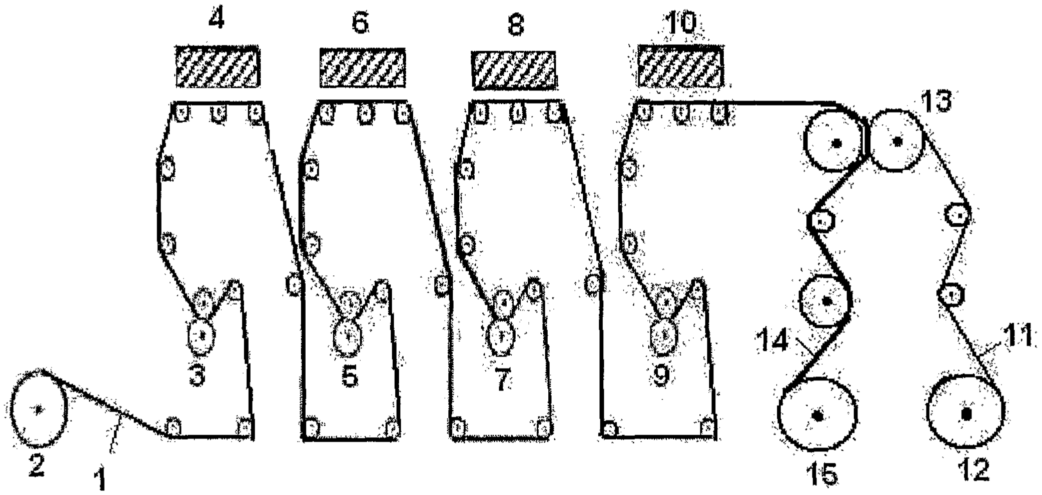
FIG. 1, shows in schematic diagram the method of producing a high security film, according to an embodiment of this invention.

Referring to FIG. 1, the method of producing high security films, according to an embodiment of this invention comprises the following steps:

i. Unwinding a roll of donor web (1) from an unwinder (2) of a multiple pass print-coating machine.

ii. Passing the donor web through a set of guide and tension control rolls and zone printing the desired indicia by passing the donor web through a web print coat station (3) containing a solution of adhesive and one or more security elements. A flexo etched plate or a gravure cylinder or any other printing process can also be used in place of web screen system.

iii. The donor web with adhesive printed indicia consisting of security elements is passed through a pre-designed set of driers (4). The solvents contained in the adhesive evaporates leaving behind a selected indicia pattern. The temperature in the dryers ranges from 30° C. to 190° C., preferably from 45° C. to 150° C., more preferably from 60° C. to 120° C. The adhesive printed selective indicia pattern containing text letters or graphics or images, and security elements will have a green tack value which is enough to transfer itself when it comes in contact with the incoming receiving web.

iv. The donor web with adhesive printed indicia consisting of security elements is then passed through another gravure print station (5) containing a solution of adhesive and one or more security elements. The security elements in the adhesive are either the same or different from the previously used security elements, depending upon the degree of security required for the security paper. The same process can be repeated any number of times to produce a security film having multiple security features.

v. The donor web (10) produced as per the above steps, containing the adhesive printed selective indicia pattern along with one or more security elements is then is then brought together with the incoming receiving web (11). The webs brought together are laminated together by applying pressure at the nip rolls/press rolls (13) to form a laminate (14). The pressure applied at the nip/press rolls ranging from 0.5 psi to 10 psi, preferably from 1 psi to 6 psi, more preferably from 2 psi to 4 psi.

vi. The laminate is then immediately split/separated out and the donor web and receiver web are rewound on two different shafts to transfer the adhesive printed selective indicia pattern along with one or more security elements to the receiver web forming a high security film.

vii. Preferably, the laminate (14) from step (v) is rewound on a rewinder (15) and is kept for a specified period of aging which ranges between 2 minutes to 72 hours, preferably 5 minutes to 36 hours and more preferably 10 minutes to 24 hours and then the two webs are separated.

The donor web (1) which can be a hot stamping foil consists of various layers such a plastic film coated with at least a release lacquer and subsequent performance oriented lacquers such as, but not limited to a dye coat for specific effect, a tie coat to tie the dye coat and vacuum deposited metal, a metallic coat, which includes metallic flakes, vacuum metal deposition, fine oxide deposition, etc.

The donor web (1), which can be a holographic foil having holographic images, includes all types of holograms made from various types of shims, using diverse technologies like, but not limited to, dot matrix, electron beam, laser, 2 Dimensional, 3 Dimensional, etc. whether machine readable or not, whether in roll, tape or sheet forms or any shapes. Certain holographic images made by patented processes have been registered as trademarks, like Moviegrams, Kinegrams etc. These shall also be included as holographic images for the purpose of this invention.

The dye coat of the donor web may be replaced with a color shift lacquer to give a different effect or the hot stamping foil or the holographic foil may have a clear dye coat to give a silver metallic look.

Further, this invention provides a donor film wherein one or more security elements are incorporated into one or more layers of the donor film itself. The donor film including security elements is then used as a donor web for the print transfer process as described in FIG. 1.

The donor film with security elements is produced as follows:

Unwinding of a carrier web i.e. a plastic film such as a such as a polyester film or a polypropylene film and the like, having thickness ranging from 3 microns to 50 microns. Coating the carrier web with a release coat such as a silicone coating, wax coating and the like. The thickness of the release coat ranges from 0.01 to 5 microns. Drying the release coat by passing it through a set of dryers, the temperature in the dryers ranging from 30° C. to 150° C., preferably from 40° C. to 100° C., more preferably from 50° C. to 90° C. Mixing a dye coat with one or more security elements and coating the same on the release coated side of the plastic film. The dye coat is formed by mixing of film forming binders such as nitrocellular lacquers, acrylic resins, transparent dyes and the like, as is well known in the art. The thickness of the dye coat ranges from 0.01 to 5 microns. Drying the dye coat by passing it through a set of dryers, the temperature in the dryers ranging from 40° C. to 190° C., preferably from 60° C. to 170° C., more preferably from 70° C. to 150° C. Applying a tie coat mixed with one or more security elements over the dye coat. The tie coat is formed by mixing of film forming binders, high strength resins selected from polyurethanes, acrylics, polyesters and the like, as is well known in the art. The thickness of the tie coat ranges from 0.01 to 5 microns. Drying the tie coat by passing it through a set of dryers, the temperature in the dryers ranging from 40° C. to 190° C., preferably from 60° C. to 170° C., more preferably from 70° C. to 150° C. The above mentioned coats are applied using coating processes such as gravure, flexo plate, air knife, mayer bar and the like. Vacuum deposition of metals such as aluminium, zinc and the like over the tie coat as per the process are well known in the field. The thickness of the vacuum deposited aluminium layer ranges from 1 micron to 5 microns. Optionally applying an adhesive coat mixed with one or more security elements, over the vacuum deposited aluminium layer. The adhesive performs when heat and pressure is applied and is formed by mixing low melting resins with high adhesion bond value, high tack adhesives, acrylic adhesives, tackifiers and the like, as is well known in the art. The thickness of the adhesive layer ranges from 1 micron to 9 microns. Drying the adhesive layer by passing it through a set of dryers, the temperature in the dryers ranging from 40° C. to 190° C., preferably from 60° C. to 170° C., more preferably from 70° C. to 150° C.

Other coatings such as abrasion resistant coats or any other coats giving different effects can also be applied during the formation of the donor film.

Figure 1A:
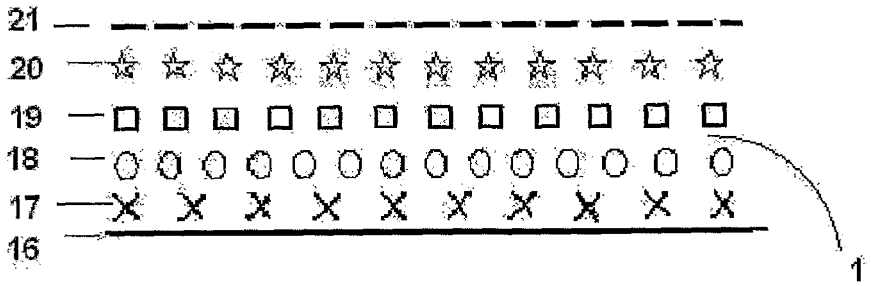
FIG. 1A, shows in schematic view, the donor film, showing its various layers, for making the high security film, according to an embodiment of this invention.

One such donor film so formed is shown in FIG. 1A wherein (16) shows a layer of carrier web, (17) is the release coat, (18) shows a dye coat incorporated with one or more security elements, (19) is a layer of tie coat, i.e. a lacquer incorporated with one or more security elements, (20) comprises a metallic layer and (21) shows the layer of a heat activated and pressure activated adhesive incorporated with one or more security elements.

Further, one or more security elements can be incorporated into one or more different layers of the donor film.

Thus, the donor film consisting of security elements, produced as per the above process, is then used as a donor web for producing a high security film as per this invention. This will provide multiple security features in the security paper and thus enhance the security.

The indicia can include any type of a text, graphics or image which is printed on any of the webs as per pre-specified design. This can be visible or invisible and may be machine-readable using external readers like specific electronic readers, light sources, PCRs or computers.

The adhesive is selected from the solvent-based adhesives, of such as hydrocarbons, Xylenes, Toluols, organic solvents, ketonic solvents, alcohols or their derivatives or any combinations there of. These The solvents may also be water based in certain cases. The adhesive lacquer may contain one or a combination of resins, such as acrylics, polyurethane, PVAC (Polyvinyl acetate), epoxy, tackifying agents and the like. These adhesives may be one component or multi component. i.e. may be based on external catalyst or direct. However, these adhesives are by no means limiting.

Optionally, the adhesive is water based consisting of a mixture of water and gluing ingredients, such as a glue/CMC/starch solution, thereby partially spot wetting the water soluble film and enabling the adhesion to the preformed WSF, optionally using pressure rollers and then rewinding this ensuing carrier on an external rewinder with two distinct webs. The temperature of the water at the print station or stations in case of multiple and distinct security features are used but before the webs are laminated, shall range between 10° C. to 95° C., preferably between 20° C. to 80° C., more preferably between 30° C. to 75° C.

The security elements contained in the adhesive or different layers of the donor film are selected from overt or covert security elements such as rare earth pigments, light fluorescing pigments, machine readable materials, DNA taggants, magnetic particles, UV upconversion pigments, security dyes, micro tracers, nano particles and the like and are either visible, invisible or machine readable using external readers like specific electronic readers, light sources, PCRs or computers.

Optionally, reverse printing of the desired indicia can also be done in the same manner as per the requirement.

The receiver web is a water soluble film (WSF). Optionally, a plastic film can also be used as a receiver web.

The WSF can be manufactured by process of direct casting on a conveyor, by casting on a detachable liner, by casting from a T-die casting, by blowing film on extrusion machines, or by extrusion via T-die extrusion. The formulation of the WSF shall determine the temperature of water in which the WSF shall easily dissolve. This range of water temperature shall vary, but not limited to, between 5° C. to 100° C. For the purpose of this invention it is clarified that WSF encompass all types of WSF made from any of the above methods, including direct coating of WSF film forming resins.

The water soluble film mentioned here may be either cold water soluble or warm water soluble or hot water soluble depending upon the formulation and resins or their combination used, e.g., the higher the mole value of the resin, the lower the solubility of the film and the lower the mole value of the resin, the higher the solubility.

CWSF: cold water soluble film shall mean a water soluble film which dissolves in water having temperature ranging from 1° C. to 35° C., preferably from 6° C. to 30° C., more preferably from 10° C. to 25° C.

WWSF: warm water soluble film shall mean a water soluble film which dissolves in water having temperature ranging from 30° C. to 55° C., preferably from 35° C. to 50° C.

HWSF: hot water soluble film shall mean a water soluble film which dissolves in water having temperature ranging from 55° C. to 95° C., preferably from 60° C. to 85° C., more preferably from 65° C. to 75° C.

NSHF: non-soluble hydrophilic film shall mean a film which does not dissolve in water but is of hydrophilic nature, i.e., has affinity towards moisture or water or water based liquids and this film is also completely biodegradable. This type of film will swell on application of moisture but will not dissolve in totality.

The raw materials used for manufacturing water soluble films are selected from polyethylene glycol, glycerin, propylene glycol, polyvinylpyrrolidone, proteinaceous binders such as gelatin, modified gelatins such as phthaloyl gelatin, sodium alginate, polysaccharides such as starch, gum Arabic, pullulan and dextrin, tragacanth gum, guar gum, acacia gum, polyacrylic acid, methylmethacrylate copolymer, carboxyvinyl polymer, amylose, sweeteners, pectin, chitin, chitosan, levan, elsinan, collagen, zein, gluten, soy protein isolate, casein, shallac and water-soluble cellulose derivatives or combination thereof. The cellulose derivatives used are methyl cellulose, hydroxy propyl cellulose, hydroxy propyl methyl cellulose, hydroxy propyl ethyl cellulose, hydroxy ethyl cellulose, carboxy methyl cellulose, Polyvinyl alcohol copolymer ionomers, Polyvinyl alcohol homopolymer, non-ionomeric poly vinyl alcohol polymer, Polymethacrylate, polyvinyl alcohol, polyacrylamide, polymethacrylamide, polyacrylic acid, polymethacrylic acid, polyurethane. However, these raw materials are by no means limiting.

Further, after the separation of the two webs on two different shafts, the donor roll may be used to donate another set of an indicia pattern by shifting the registration during the print process. Hence, this will result in lot of saving to reduce the costs of end product.

As per one of the embodiments of the invention, the above process can also be carried out by printing selective indicia with the help of adhesive containing one or more security elements on the receiver web, drying and then laminating a donor web, so as to transfer the metallic surface of the donor web on the receiver web.

The resultant product being a high security film, will have very complex array of texts, graphics and images which are precisely registered and cleanly transferred onto a receiver film based web having one or more security elements in one or more text or a nano-part of an image or graphic which can be identified with a specified light source such as, but not limited to, an Ultraviolet light of varying nanometers or an infra red light or an electronic reader reading peaks and valley values of a rare earth pigment or a dye or a specified magnetic field.

This high security film roll may optionally be slit into micro tapes, also known as security thread, and is then inserted into the paper during the paper making process as per the methods well known in the prior arts.

As per one of the embodiments of the invention, the whole web of the security film is inserted into the paper web during the paper making process, so that the indicia including letters and graphics printed in a particular pattern and shape can also be incorporated into the paper at a precise location. The whole web of the film can be inserted at the couch roll or at the vacuum chamber or at the press rolls of the cylinder mold machine; or at the dandy roll of a fourdriener machine or between two paper beds.

Figure 2:
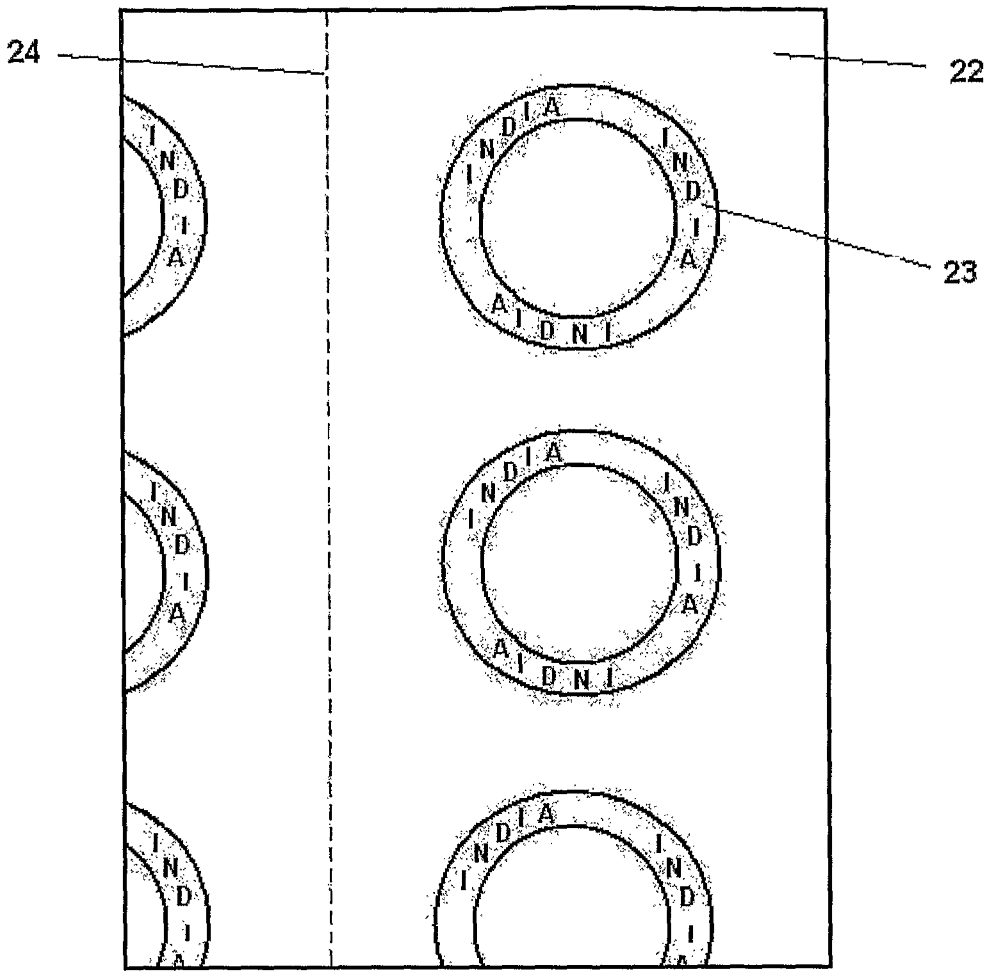
FIGS. 2 and 2A, show in perspective view, the high security film web with printed indicia in a different pattern and a currency note incorporated with the high security film.
Figure 2A:
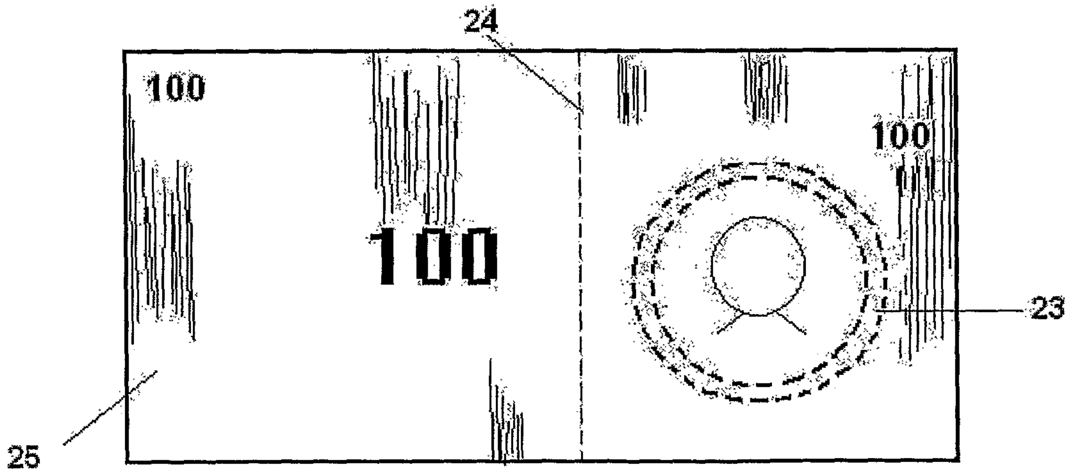

FIG. 2 shows a web of the receiver film (22) transfer printed with indicia (23) in a circle form. The web (22) is cut into a smaller web from (24). The smaller web is then inserted into the paper during the paper making process, at precise location, to produce a security paper such as a banknote paper (25) as shown in FIG. 2A.

Example 1

We unwound a metallic donor web having a thickness of 12 microns at the unwinder. We printed the indicia letter ‘I’ by gravure printing method, using an ethyl acetate based adhesive CAC 1511 and hardener as available from Converter Adhesive and Chemical Ltd. and passed it through dryers for evaporating the solvent of the adhesive as per the process shown in FIG. 1. The ethyl acetate based adhesive (1 liter) is mixed with 100 grams of UV fluorescent pigment invisible to red prior to printing. After drying the adhesive printed indicia letter ‘I’, the metallic donor web is then transferred through a second gravure printing head wherein indicia letter ‘N’ is printed using the same adhesive as used earlier but different security element. The ethyl acetate based adhesive (1 liter) is mixed with 100 grams of UV fluorescent pigment invisible to yellow. In the same manner other indicia letters such as D, I and A are printed by or through consecutive gravure printing heads. Indicia letter ‘D’ will consist of UV fluorescent pigment invisible to green, indicia letter ‘I’ will consist of UV fluorescent pigment invisible to yellow, and indicia letter ‘A’ will consist of UV fluorescent pigment invisible to red. We then laminated the metallic donor web with adhesive printed indicia to a preformed hot water soluble film, having a thickness 20 microns, as is available from Arrow Coated Products Ltd. The laminated web was kept an ageing period of 72 hours. Then we separated the two webs. The adhesive printed indicia were by this time transferred on the hot water soluble film. The hot water soluble film was then slit into micro tapes to get a high security thread as shown in the FIG. 3, which can be then inserted into the paper during the paper making process.

Figure 3:
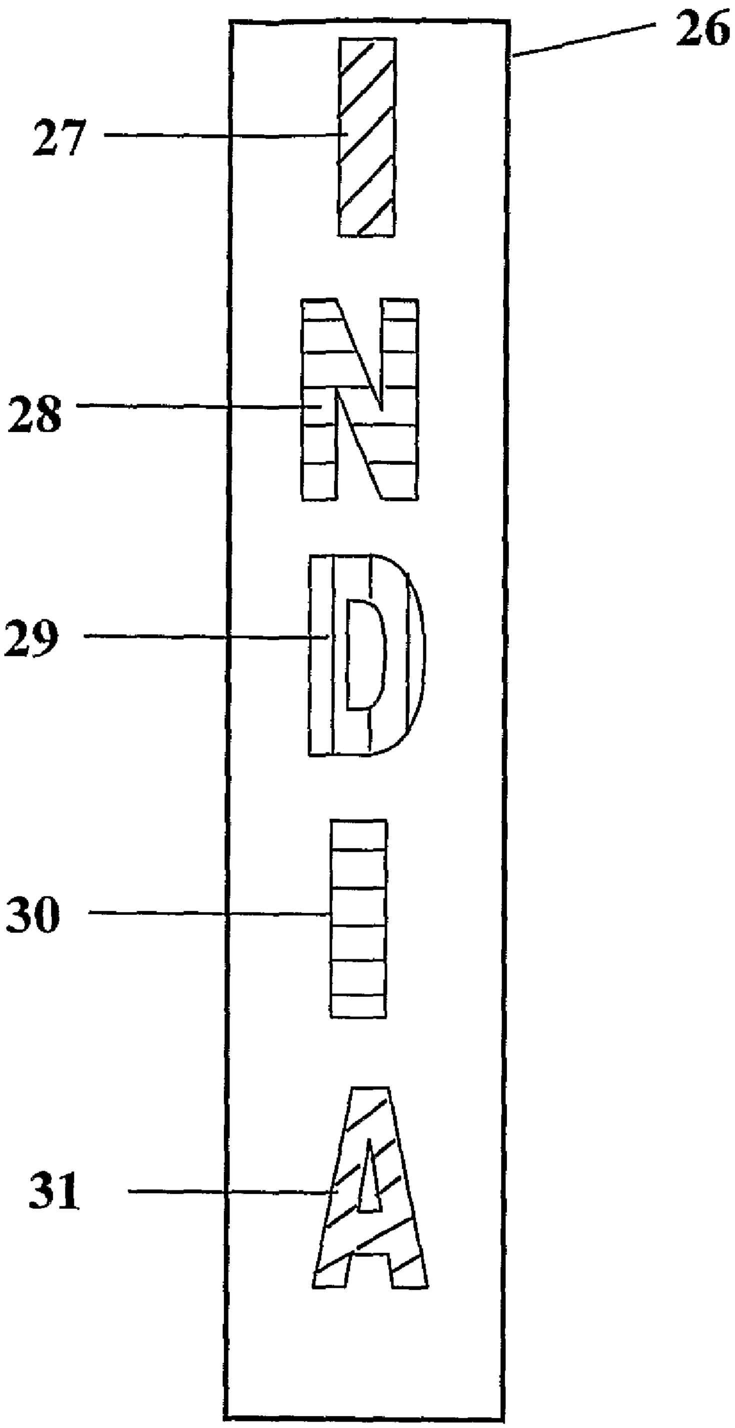
FIG. 3, shows in perspective view, the high security thread with printed indicia having different security elements in various patterns.

FIG. 3, shows a high security thread (26) wherein indicia letter ‘I’ (27) consists of UV fluorescent pigment invisible to red, indicia letter ‘N’ (28) consists of UV fluorescent pigment invisible to yellow, indicia letter ‘D’ (29) consists of UV fluorescent pigment invisible to green, indicia letter ‘I’ (30) consists of UV fluorescent pigment invisible to yellow and indicia letter ‘A’ (31) consists of UV fluorescent pigment invisible to red. Hence, when the above high security thread is observed under a UV transmitted light, the indicia letter ‘I’ (27) will appear red, the indicia letter ‘N’ (28) will appear yellow, the indicia letter ‘D’ (29) will appear green and so on. Hence, it will be very difficult for counterfeiters to provide a security paper with such as high security thread.

Example 2

We unwound a roll of a carrier film, i.e., a plastic film having thickness of 10 microns and we coated it with a hot wax based release coat having thickness 0.5 microns. A layer of a dye coat, i.e., a vinyl based resin solution having thickness of 1 micron was then applied on the release coated side of the plastic film. The resin solution used as a dye coat consisted invisible UV fluorescing red pigment, as available from Honeywell, Germany. 25 ml of the fluorescing pigment was mixed with 1000 ml of the resin solution.

A tie coat, i.e., an acrylic based resin solution, having a thickness of 1 micron was then applied above the dye coat. The tie coat consisted of DNA taggants, as available from Tracetag, U.K. 10 gms of the DNA taggants were mixed with 1000 ml of the resin solution.

The tie coat side of the plastic film was then metallised in a vacuum chamber, using aluminium. The thickness was about 2 microns.

The donor film, consisting of security elements, was then used as a donor web for producing a high security film as per the process described in this above.

The high security film so formed as per the invention, using the above mentioned donor film consisting of security elements was then slit into micro tapes/thread and then inserted into the paper web as per the process well known in the art. The paper consisting of the security thread was then subjected to testing and DNA taggant was observed to be present. Also the printed indicia appeared red under the UV transmitted light because of the invisible UV fluorescing red pigment being present in the dye coat.

We claim:

1. A method of producing high security film for incorporating into a security paper such as currency note paper or the like; the method comprising the following steps:

(i) loading a roll of a donor web on an unwinder of a multipass print-coat machine, unwinding and passing the donor web through a set of guide and tension control rolls into a printing zone;

(ii) printing desired indicia on the donor web by passing the donor web through one or more print station(s) containing a solution of adhesive and one or more security element(s);

(iii) drying the donor web with adhesive printed indicia containing security elements by passing the donor web through one or more set of driers for evaporating the solvent contained in the adhesive, leaving a desired selective indicia pattern;

(iv) laminating the donor web containing said adhesive printed selective indicia pattern along with one or more security element(s), with a receiver web by passing the donor web and receiver web through nip/press rolls;

(v) rewinding the laminated donor web and receiver web from step (iv) on a rewinder; aging the laminated donor web and receive web by stacking the roll on a stacker for a desired aging period and then splitting/separating out the laminated donor web and receiver web on two different shafts; and (vi) splitting/separating out the donor web and receiver web, on two different shafts to transfer the adhesive printed selective indicia pattern to the receiver web forming security film.

2. The method according to claim 1 in which the donor web is a hot stamping foil or a holographic foil or a non metallic stamping foil.

3. The method according to claim 1 in which the donor web comprises a first layer of plastic film, a second layer of release coat, a third layer of dye coat and a fourth layer of metallic coat.

4. The method according to claim 3 in which the donor web also includes one or more other layers chosen from the group consisting of tie coats, protective coats, coatings for various effects, and adhesive coats.

5. The method according to claim 3 in which one or more security elements are added in one or more layers of the donor web.

6. The method according to claim 1 in which the printing of the desired indicia on the donor web is carried out at the print station by using gravure cylinder or a flexo etched plate or a web screen system.

7. The method according to claim 1 in which the printing process of donor web with adhesive containing security elements is repeated any number of times in a number of print-coating stations and the security element in the adhesive at each print station can be the same or different depending upon the degree of security required for the security paper.

8. The method according to claim 1 in which the indicia includes any type of texts, graphics or images or a combination thereof printed on the donor web in a desired pattern.

9. The method according to claim 8 in which the indicia printed on the donor web is visible or invisible or machine readable using external readers.

10. The method according to claim 1 in which the adhesive solution used for printing contains resins chosen from the group consisting of acrylics, polyurethane, polyvinyl acetate (PVAC), epoxy resins, and combinations thereof.

11. The method according to claim 1 in which the adhesive used for printing is a water-based adhesive.

12. The method according to claim 1 in which the security elements contained in the adhesive solution used for printing are selected from overt or covert security elements.

13. The method according to claim 1 in which the security elements are either visible, invisible or machine readable using external readers.

14. The method according to claim 1 in which the receiver web is a water soluble film (WSF).

15. The method according to claim 14, in which the WSF is either a cold water soluble film or a warm water soluble film or a hot water soluble film, the water temperature depending upon the formulations and resins of the WSF and ranges between 5° C. to 100° C.

16. The method according to claim 1, in which the receiver web is a plastic film.

17. The method according to claim 1, in which the temperatures at the set of driers used for evaporating the solvent ranges from 30° C. to 190° C.

18. The method according to claim 1, in which the pressure applied at the nip/press rolls for laminating the two webs ranges from 0.5 psi to 10 psi.

19. The method according to claim 1, in which reverse printing of the desired indicia is carried out.

20. The method according to claim 1 wherein the said receiver web with security elements is slit into micro tapes and inserted into a paper web during a paper making process.

21. The method according to claim 1, in which the receiver web with security elements is inserted into a paper web during a paper making process.

22. A method of producing high security film for incorporating into a security paper such as currency note paper or the like; the method comprising the following steps:

(i) loading a roll of a donor web on an unwinder of a multipass print-coat machine, unwinding and passing the donor web through a set of guide and tension control rolls into a printing zone;

(ii) printing desired indicia on the donor web by passing the donor web through one or more print station(s) containing a solution of adhesive and one or more security element(s);

(iii) drying the donor web with adhesive printed indicia containing security elements by passing the donor web through one or more set of driers for evaporating the solvent contained in the adhesive, leaving a desired selective indicia pattern;

(iv) laminating the donor web containing said adhesive printed selective indicia pattern along with one or more security element(s), with a receiver web by passing the donor web and receiver web through nip/press rolls;

(v) rewinding the laminated donor web and receiver web from step (iv) on a rewinder;

(vi) aging the laminated donor web and receiver web by stacking the roll on a stacker for a period ranging from 2 minutes to 72 hours; and (vii) splitting/separating out the donor web and receiver web, on two different shafts to transfer the adhesive printed selective indicia pattern to the receiver web forming security film.

23. A method of producing high security film for incorporating into a security paper such as currency note paper or the like; the method comprising the following steps:

(i) loading a roll of a donor web on an unwinder of a multipass print-coat machine, unwinding and passing the donor web through a set of guide and tension control rolls into a printing zone;

(ii) printing desired indicia on the donor web by passing the donor web through one or more print station(s) containing a solution of adhesive and one or more security element(s);

(iii) drying the donor web with adhesive printed indicia containing security elements by passing the donor web through one or more set of driers for evaporating the solvent contained in the adhesive, leaving a desired selective indicia pattern;

(iv) laminating the donor web containing said adhesive printed selective indicia pattern along with one or more security element(s), with a receiver web by passing the donor web and receiver web through nip/press rolls;

(v) perforating said receiver web with security elements at selective places;

(vi) inserting the perforated receiver web with security elements into a paper web during a paper making process;

(vii) splitting/separating out the donor web and receiver web, on two different shafts to transfer the adhesive printed selective indicia pattern to the receiver web forming security film.

* * * * *